July 28, 1959 C. P. MARSDEN, JR., ET AL 2,897,394

CERAMIC WAFER, ELECTRONIC TUBE

Filed Aug. 31, 1953

INVENTORS
CHARLES P. MARSDEN, Jr.
FRANK H. BREWER

BY

ATTORNEYS

United States Patent Office 2,897,394

Patented July 28, 1959

2,897,394

CERAMIC WAFER, ELECTRONIC TUBE

Charles P. Marsden, Jr., Washington, D.C., and Frank H. Brewer, Kensington, Md., assignors to the United States of America as represented by the Secretary of the Navy Application August 31, 1953, Serial No. 377,748

6 Claims. (Cl. 313—245)

(Granted under Title 35, U.S. Code (1952), sec. 266)

The invention described herein may be manufactured and used by or for the Government of the United States of America for governmental purposes without the payment of any royalties thereon or therefor.

This invention relates to improvements in electrical space discharge devices, particularly tubes, either vacuum or gas filled particularly adapted for use with module type electronic circuit constructions.

An object of this invention is to provide a tube capable of mechanized mass production, which is at least as responsive as ordinary glass or metal cased tubes and which is adapted for use with module type electronic circuit constructions. This is accomplished by using ceramic wafers of the "Tinker Toy" type which can be machine handled for the tube envelope and also as a support for the tube components.

More specifically, an object of the invention is to provide a vacuum (or gas) envelope for the electrical discharge components, e.g. the anode, grid and cathode, the envelope consisting of a plurality of square flat ceramic wafers, superposed and bonded together by metal films that chemically unite with the ceramic, the central wafers being apertured to form the vacuum chamber proper, and each of the wafers having edge notches that accommodate wires for connection with an external circuit, the wires also being connected to the metal films which, in turn, are connected with the tube components. In this way, the metal films serve the double purpose of connecting the wafers and also conducting from and to the anode, cathode, heater, etc. Moreover, with wires extending in the wafer notches, there are available large quantities of conductors from the various internal tube components that may be connected in an external circuit of the module type without usual tube connectors or tube bases and sockets. Accordingly, total elimination of tube sockets is achieved.

Other objects and features of importance will become apparent in following the description of the illustrated forms of the invention.

Figure 5:
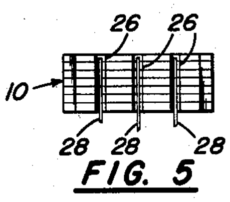
Fig. 5 is an elevational view of a tube.
Figure 1:
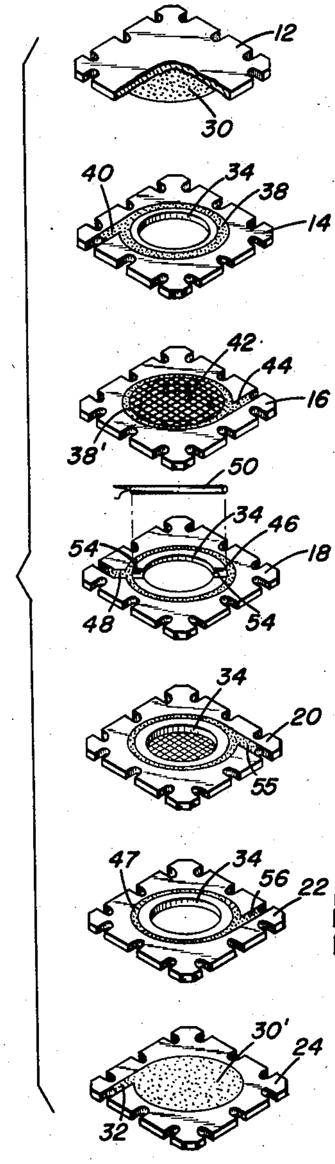
Fig. 1 is an exploded perspective view of a triode.

In Fig. 1, there are the parts of a triode 10, shown assembled in reduced scale (Fig. 5), but the representation is considerably larger than the actual tube. Accordingly, the tubes made in accordance with the invention will be very small and light, and as such are ideal for airborne use. It is understood that this does not preclude larger tubes but merely indicates the preferred tube size range for which the tube is designed. Dimensions of the illustrated triode are seven eighths of an inch square by one fourth inch thick and the weight is one third of an ounce. The weight and thickness may very slightly with the type of tube constructed. As will be obvious as the description proceeds, the tube constructions of the present invention are particularly adapted for use with module type electronic circuit constructions of the type described and claimed in copending application Serial No. 318,148, filed October 31, 1952, now Patent No. 2,774,014, for Modular Electronic Assembly, and for assembly by apparatus of the type described and claimed in copending application Serial No. 510,593, filed May 23, 1955, for Automatic Evacuation System for Electron Tubes, both of said applications being assigned to the assignee of the present invention.

Each of the wafers 12, 14, 16, 18, 20, 22 and 24 is made of an electrically insulating material, preferably a ceramic such as one of the steatites, fosterites, zircon porcelains and aluminas. In this way all or a part of each wafer may be used to form the tube envelope, and also to support a tube component. Three notches are formed in each edge of the wafers, and when the wafers are assembled, the notches are aligned to form grooves, as those indicated at 26 (Fig. 5) to accommodate contact forming wires 28 of a standard modular unit (not shown). Wafers 12 and 24 may be standard "Tinker Toy" wafers and wafers 14, 16, 18, 20, and 22 may be formed from standard "Tinker Toy" wafers.

Wafer 12 has an anode 30 on one surface of it, the anode being a circular metal film bonded mechanically (soldering) or chemically on both or one surface of the wafer. The film is smaller in diameter than the distance across the wafer 12 measured at the innermost portions of the notches, thereby leaving a space on wafer 12 between the anode and the notches. Wafer 24 is similar to wafer 12 in that it has an anode 30' identical to anode 30, the described space being clearly evident on wafer 24. In addition, the contact 32, formed as a continuation of anode 30', is illustrated, contact 32 being a strip adhering to the wafer and terminating in one of the edge notches of its wafer.

Wafers 14, 16, 18, 20 and 22 each have a central aperture or opening 34, and the openings are aligned when the wafers are stacked, in order to form a vacuum or gas chamber to contain the tube components. The ceramic wafer 14 is a spacer, separating the anode supporting wafer 12 from the grid supporting wafer 16. An electrically conductive seal 38 is provided on the upper surface of spacer 14, and is circular and of such size as to contact anode 30. A strip 40 extends from the seal 38 and terminates at a notch in the edge of wafer 14 that is in alignment with the notch that has the anode 30 contact strip terminating therein.

Figure 6:
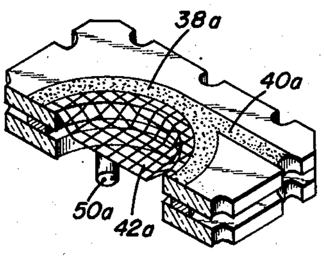
Fig. 6 is a fragmentary perspective view of a tube with a unique grid arrangement.
Figure 7:
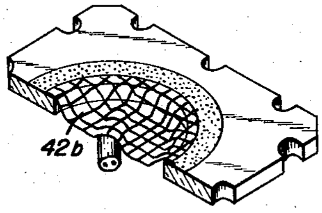
Fig. 7 illustrates a further grid modification.

A grid structure 42 is provided on wafer 16 over its central aperture, and there is a seal 38' on wafer 16, this seal being similar to seal 38, but connected with and securing grid 42. Contact strip 44 extends from seal 38' on the surface of wafer 16, and it terminates at one of the notches in the edge of wafer 16. Grid 42, as well as grids **42*a* and 42*b* of Figs. 6 and 7 are made of an electrolytically plated nickel mesh, one example being 80 x 80 mesh 0.0005 inch thick and having a shadow fraction of less than 15 percent. To obtain proper grid-cathode spacing (about 0.005 inch to 0.015 inch), the reentrant grid 42*a* may be used, it being molded or otherwise preformed to shape so that its periphery may be connected to and secured by seal 38*a*, the latter having contact 40*a* extending therefrom. In the construction of Fig. 6, the cathode assembly 50*a*** would be oval in cross section, with a flat part of the oval facing the grid mesh, A further departure is shown in Fig. 7 where it is contemplated to form the reentrant part of grid 42*b* with a pocket shaped to follow the lengthwise contour of the cathode. The grid constructions of Figs. 6 and 7 are more rigid than grid 42, however, the mesh when used as a flat (Fig. 1) disc will be stretched taut by the larger contraction of the nickel than the ceramic wafers during cooling from the sealing temperature. While it is, at the present time, preferred to use an electrolytically formed mesh because of its rigid, integral structure, it is realized that other grid structure may be used, such as woven mesh, perforated sheet or parallel wires welded or brazed to a supporting ring.

Wager 18 (Fig. 1) has seal 46 and contact strip 48 terminating at a wafer notch, and a cathode and heater assembly 50 is carried by this wafer. The cathode and heater assemblies 50 and 50*a* are conventional, being currently used in 6AK5 tubes which are commercially available. The terminal parts thereof are fitted in grooves 54 formed in wafer 18, and the electrical conductors of assembly 50 are attached to seal 46 and the seal on wafer 20 adjacent wafer 18.

Wafers 20 and 22 are identical to wafers 14 and 16, except the contact strips 35 and 56 terminate at different edge notches. The structure described may be either as a double triode or as a single triode with the anodes and grids thereof connected in parallel. In tetrode, pentode, or other multi-grid constructions, additional wafers similar to wafers 16 and 20 with or without additional spacing wafers may be added. In addition to the tube structures thus far described, a diode construction is contemplated in which the grid wafers would be eliminated. For those applications where a separate cathode lead is required, a construction is contemplated in which the cathode would occupy the space of two wafers which would provide three seals for the required electrical connections. The two wafers, combined, in this construction, would have the thickness of one wafer. Alternatively, if it is desired to use wafers of normal thickness, the re-entrant part of the grids and anode could be made deeper in order to maintain proper electrode spacing.

Figure 2:
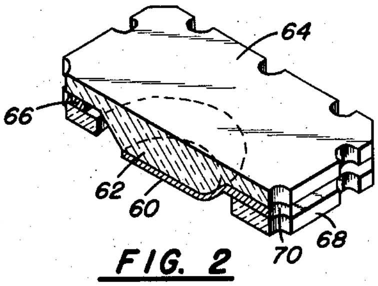
Fig. 2 is a fragmentary perspective view of a modification of an anode.
Figure 3:
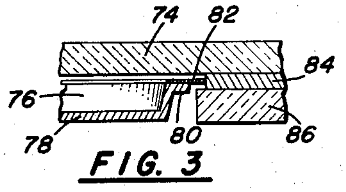
Fig. 3 is an enlarged fragmentary sectional view of a construction detail.
Figure 4:
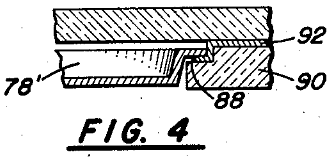
Fig. 4 is an enlarged fragmentary section view of a further modification.

The modifications of Figs. 2, 3 and 4, in addition to previously described Figs. 6 and 7, are provided to show that the tube may be made by using slightly different structures. Fig. 2 has anode 60 formed, i.e., painted or otherwise connected, on a thickened central core 62 of wafer 64, the seal 66 connecting wafer 64 to spacer wafer 68. Contact strip 70 extends from the seal 66 to an edge wafer notch, and provides means to which connection from an external circuit to anode 60 may be made.

Fig. 3 has upper wafer 74 a mere cover for gas or vacuum chamber 76, while anode 78 is a metal disc with an annular shoulder 80 to which metal ring 82 is fixed, ring 82 being also fixed to seal 84 that connects wafer 74 to spacer wafer 86.

Fig. 4 has anode 78', identical to anode 78, resting on an annular depression 88 of spacer wafer 90, being connected thereto by seal 92 that is fixed to the wafers and anode shoulder 80'. Even though these variations are described with specific reference to anodes, they are equally as applicable to grids, cathodes and other tube components.

In a manner fully described in copending application Serial No. 318,148 referred to above, the wafer notches in which the contact strips terminate are metalized whereby connection may be made through supporting wires 28 from the various tube elements to the various circuit elements of the complete modular unit.

In order to manufacture operative diodes, triodes and others, the method of assembly of the described parts must be known. Seals 38, 38' and the others are important since they must connect the wafers together so securely that a vacuum is held in the compoennt chamber. In this connection, a ring and strip is first applied, as by spraying, printing, painting etc. on the wafer, using a suspension of titanium hydride in nitrocellulose solution. A ring of braze metal, for example, copper-silver eutectic (BT) is then applied to the titanium hydride. Similarly, the grid mesh or anode material are applied to the ceramic wafer so that their edges will touch the titanium hydride and thus be bonded to the ceramic in the brazing process. Assembly 50 may be laid in grooves 54, but the grooves need not be supplied, since their function is for facility of assembly and do not contribute to the tube response. At any rate, it is necessary that the assembly 50 have one heater lead in contact with one seal, for example, seal 46, while the other heater lead contacts another seal, e.g. the seal on wafer 20 adjacent wafer 18, whereby a heater circuit may be established through two different wires 28 while the cathode lead may be connected to seal 46 or to any other seal as desired. A facile mode of assembly consists of the use of an assembly jig to contain the parts as they are dropped or otherwise placed in it. The reentrant features of Figs. 6 and 7 will then be especially useful in that the grids will be self centering in their wafers.

There are several processes for hermetically sealing metal-ceramic assemblies, some of which are mentioned herein, and all of which are adaptable to the production of the tube. The titanium hydride or Bondley process relies on the chemical activity of the titanium metal produced by the decomposition of the hydride at about 600° C. Some of this metal reacts with the oxides of the ceramic to produce oxides of titanium which then combine chemically with the oxides of the ceramic. Thus, there is produced a gradual transition from the pure oxides of the ceramic, through titanium oxide-ceramic oxide compounds, through titanium oxide, titanium metal compounds and finally to pure titanium metal which is readily wet by and alloyed with the brazing metal.

Other hydrides of active metals may be used such as the hydrides of zirconium and thorium which decompose at temperatures nearer 1000° C. Almost any metal with a melting-point between 200° C. and 1500° C. has been used, although the usual ones are lead, BT (copper-silver eutectic), copper and nickel. The most pertinent criteria for the brazing metal is its vapor-pressure at its melting or flow point, as a metal with a high vapor-pressure will coat the ceramic insulating surfaces with a metallic film resulting in low interelectrode, electrical resistance.

The Telefunken process was the original method and relied on the production of the transition interface by the oxides of molybdenum. The metallic molybdenum is coated or alloyed with iron and/or nickel, which in turn is wetted by the brazing metal. One advantage of this process is that the metallic coating of the ceramics is performed in hydrogen at normal atmospheric pressure. However, the final seals of the article herein disclosed, must be made in vacuum.

The revised Telefunken process uses manganese metal or oxide to enhance the bond produced by the molyb denum. It has been shown that the manganese oxide more readily combines with some of the ceramic oxides to produce transitional spinel-type compounds. The remainder of the process is similar to that mentioned above.

The modified Bondley process uses titanium metal itself which supplies titanium for the transitional interface and for wetting by a brazing metal. The latter is required to fill up the voids or unevennesses of the surfaces as it forms a low melting-point alloy with the titanium. BT, copper and nickel have been used.

Attention is invited to the omission of exhaust tubulation and getter. No exhaust tubulation is used, as the bonding process takes place in a vacuum; and for gas filled tubes, the same prevails. By using high melting point braze metal for the wafer seals, for example, copper, nickel or their alloys, the gasses from the parts and the oxide cathode coating will be removed before attaining the temperature of sealing or melting the braze metal. Moreover, as a result of this high temperature treatment, subsequent evolution of gas is absent or negligible so that gettering is not essential.

It is understood that various modifications of the invention may be made without departing from the scope of the following claims.

What is claimed is:

1. An electric space discharge device comprising an envelope enclosing a chamber, said envelope consisting of a stack of flat ceramic wafers of uniform size and configuration, each wafer being provided with a plurality of notches in the periphery thereof, the corresponding notches of said wafers being aligned, at least one of the wafers that is disposed between two other wafers having an aperture that defines said chamber, the two end wafers of said stack being imperforate, metallic bonding means disposed betweeen each of said wafers and sealing said wafers into a single unit, an anode and cathode applied respectively to said end wafers in contact respectively with the metallic bonds between said end wafers and the wafers respectively adjacent thereto, a portion of each of the metallic bonds between at least said last mentioned wafers extending to at least one wafer notch respectively, at least said last mentioned notches being metalized.

2. A vacuum tube comprising an envelope, said envelope consisting of a group of superposed flat ceramic wafers of uniform size and configuration, each of said wafers having notches in the edges thereof which are aligned in said group to form grooves, the central wafers of said group having apertures the walls of which define a vacuum chamber, an anode and a cathode in said chamber, applied respectively to the end wafers of said group bonded metallic films on said wafers hermetically sealing together said wafers, said anode contacting one of said films and said cathode contacting another of said films, portions of said films on at least said anode and cathode wafers extending to at least one edge notch therein, at least said last mentioned notches being metalized and electrical conducting and supporting means disposed in at least some of said grooves in contact with at least some of said metalized notches.

3. In a vacuum tube, an envelope defining a chamber, said envelope consisting of comprising a stack of flat ceramic wafers, the outer wafers of said stack being imperforate, said wafers being of uniform size and configuration and having notches in the peripheries thereof, the corresponding notches of said stacked wafers being aligned, metallic bonding means disposed between adjacent wafers hermetically sealing said wafers in stacked relation, portions of said metallic bonding means extending to wafer notches, said last mentioned notches being metalized, electrical discharge components disposed between adjacent wafers in contact with said metallic bonding means, and means in said aligned notches bonded to said metalized notches to establish communication between said components and exterior circuitry.

4. In a vacuum tube, an envelope defining a chamber, said envelope consisting of a stack of flat ceramic wafers, the outer wafers of said stack being imperforate, said wafers being of uniform size and configuration and having notches in the peripheries thereof, the corresponding notches of said stacked wafers being aligned, metallic bonding means disposed between adjacent wafers hermetically sealing said wafers in stacked relation, portions of said metallic bonding means extending to wafer notches, said last mentioned notches being metalized, electrical discharge components disposed between adjacent wafers in contact with said metallic bonding means, and means comprising a plurality of wires located in said aligned notches bonded to said metalized notches to establish communication between said components and with exterior circuitry.

5. An electron tube comprising an envelope consisting of a stack of superimposed edge notched flat ceramic wafers of uniform size and configuration, the end wafers of said group being imperforate and the intervening wafers being centrally apertured to form a cavity, the corresponding notches of said wafers being aligned, metallic bonding means disposed between each pair of adjacent wafers and extending to at least one notch, the notches to which the metallic bonding means extend being metalized, an anode and a cathode applied respectively to said end wafers in contact with the metallic bonding means associated therewith, at least one discharge control element disposed between a pair of adjacent apertured wafers in contact with the metallic bonding means therebetween, and a plurality of wires disposed in the aligned notches of said wafers and bonded to said metalized notches.

6. An electron tube comprising an envelope consisting of a stack of superimposed edge notched flat ceramic wafers of uniform size and configuration, the end wafers of said group being imperforate and the intervening wafers being centrally apertured to form a cavity, the corresponding notches of said wafers being aligned, metallic bonding means disposed between each pair of adjacent wafers and extending to at least one notch, the notches to which the metallic bonding means extend being metalized, an anode and a cathode applied respectively to said end wafers in contact with the metallic bonding means associated therewith, said anode having a re-entrant configuration, at least one discharge control element disposed between a pair of adjacent apertured wafers in contact with the metallic bonding means therebetween, said discharge control element having a re-entrant configuration, and a plurality of wires disposed in the aligned notches of said wafers and bonded to said metalized notches.

References Cited in the file of this patent

UNITED STATES PATENTS

| | | |
|---|---|---|
| 2,099,531 | Passarge | Nov. 16, 1937 |
| 2,343,849 | Binneweg | Mar. 7, 1944 |
| 2,443,205 | Stutsman | June 15, 1948 |
| 2,459,277 | Halstead et al. | Jan. 18, 1949 |
| 2,460,132 | Knight | Jan. 25, 1949 |
| 2,629,066 | Eitel et al. | Feb. 17, 1953 |
| 2,647,218 | Sorg et al. | July 28, 1953 |

OTHER REFERENCES

Materials Technology for Electron Tubes by Walter H. Kohl, published by Reinhold Pub. Corp., 330 W. 42nd Street, New York, 1951, pages 403–421.